Jan. 26, 1965
C. A. SMITH
3,167,252
THERMOSTATICALLY CONTROLLED MOTORIZED HOT WATER VALVE SEALED BY FLUID PRESSURE
Filed May 8, 1961
2 Sheets-Sheet 1
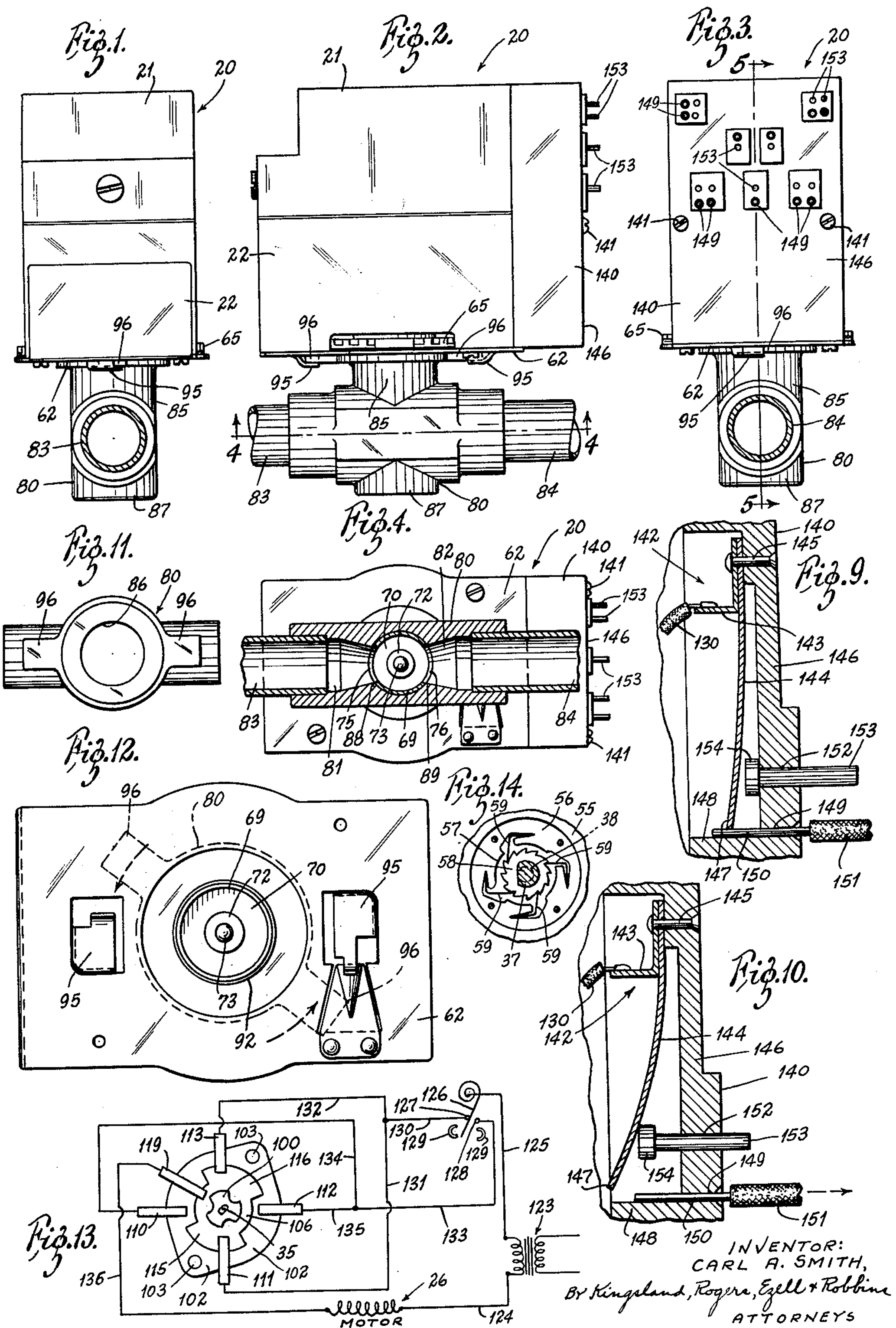
INVENTOR:
CARL A. SMITH,
BY Kingsland, Rogers, Ezell & Robbins
ATTORNEYS

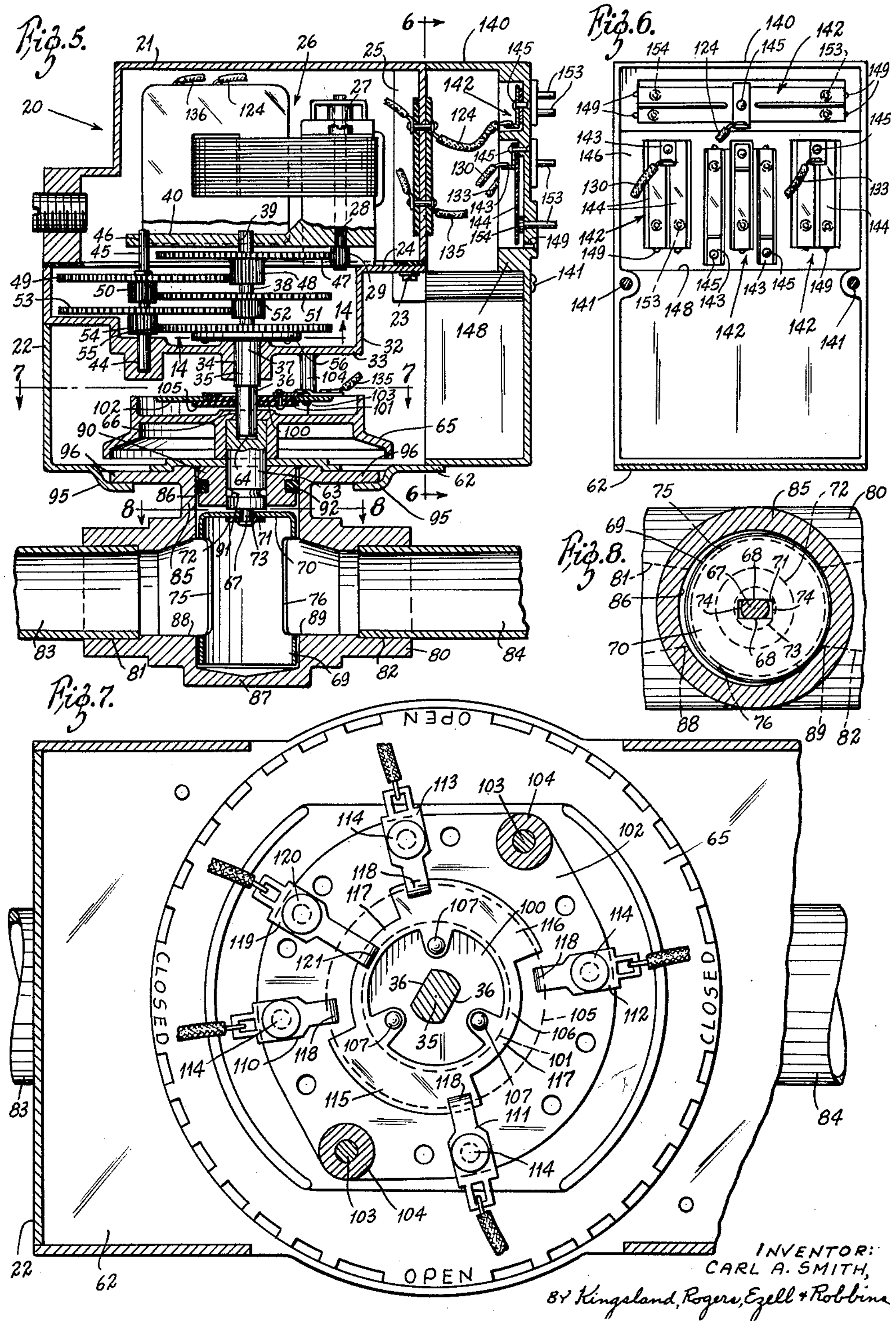
INVENTOR:
CARL A. SMITH,
BY Kingsland, Rogers, Ezell & Robbins
ATTORNEYS United States Patent Office 3,167,252
Patented Jan. 26, 1965

3,167,252

THERMOSTATICALLY CONTROLLED MOTORIZED HOT WATER VALVE SEALED BY FLUID PRESSURE

Carl A. Smith, Lemay, Mo., assignor, by mesne assignments, to White-Rodgers Company, a corporation of Missouri Filed May 8, 1961, Ser. No. 108,485
2 Claims. (Cl. 236—74)

This invention relates to an automatic two-way valve and particularly to a thermostatic controlled valve having a rotary valve member.

The valve of this invention is for use in opening and closing the conduit of a fluid flow system. The valve is especially useful under conditions wherein the fluid is water. The valve includes a chamber into which separated ends of the fluid conduit are connected so that fluid flowing through the conduit must flow through the chamber. There is a rotary valve member within the chamber, and a particular feature of the invention is the fact that the rotary valve member is hollow and deformable, having thin wall cylindrical sides, so that the valve member will respond to fluid pressure and deform against the outlet port from the chamber to provide a substantial seal against the passage of fluid through the chamber.

In addition to its deformability, the valve element is mounted for sliding movement in the direction of fluid flow and can actually slide, under fluid pressure, against the chamber wall surrounding the outlet port. The foregoing features are important objects of the invention.

A principal object of the invention is to provide a two-way valve having a rotary valve element or valve member that rotates within a valve chamber to block and unblock the flow of fluid through the valve chamber, wherein the valve member is rotated by a valve shaft, but is slidable transversely upon that valve shaft and can slide against the outlet port from the valve chamber under the pressure of fluid through the inlet port to effectively block the flow of fluid.

Still another object of the invention is to provide such a slidable valve element so that the fluid pressures exerted upon the valve member are not transmitted to the valve shaft. Thus, the valve shaft is not subjected to the stresses of the fluid pressure.

Another object of the invention is to provide a valve assembly that includes a housing, a control circuit, a motor controlled by the control circuit, and a valve member driven by the motor through a gear reduction train mechanism, all of which are assembled as a single unit that can be readily mounted to a valve chamber pipe fitting. A broader object is to provide a valve assembly that is quickly and readily replaceable by a similar valve assembly.

Still another object of the invention is to provide a valve assembly that is readily replaceable by another similar valve assembly wherein the wire connections to the valve assembly for controlling it incorporate quickly releasable means for allowing ready connection and disconnection of the wires.

Other objects and advantages will be apparent to those skilled in the art.

In the drawings:

FIGURE 1 is an end elevation view of the valve;

FIGURE 2 is a side elevation view of the valve taken from the right side of FIGURE 1;

FIGURE 3 is an end elevation view of the valve taken from the right side of FIGURE 2 and opposite the end of FIGURE 1;

FIGURE 4 is a view in section taken along the line 4—4 of FIGURE 2;

FIGURE 5 is an end to end side elevation view in section and on an enlarged scale taken along the line 5—5 of FIGURE 3;

FIGURE 6 is a view in section taken along the line 6—6 of FIGURE 5;

FIGURE 7 is a view in section taken along the line 7—7 of FIGURE 5;

FIGURE 8 is a view in section taken along the line 8—8 of FIGURE 5;

FIGURE 9 is an enlarged view in section of a wire lock, in wire locking condition;

FIGURE 10 is an enlarged view in section of a wire lock of FIGURE 9 but showing the wire lock in wire releasing condition;

FIGURE 11 is a plan view of the pipe fitting part of the valve with the valve housing removed;

FIGURE 12 is a bottom view on an enlarged scale of the valve housing with an outline of the pipe fitting shown in dotted lines;

FIGURE 13 is a schematic wiring diagram of the valve control circuit; and

FIGURE 14 is a view in section taken along the line 14—14 of FIGURE 5.

Referring now to the drawing, the valve includes a valve housing 20. This housing contains the valve drive mechanism and valve control mechanism. The housing 20 has an upper section 21 and a lower section 22 fastened together by screws 23 that extend upwardly through the top wall 24 of the lower housing into threaded bosses 25 in the upper housing.

A fractional horsepower motor 26 is fastened by bolts 27 to the upper wall 24 of the lower housing 22. The motor 26 has a drive shaft 28 with a pinion gear 29 fixed to the shaft 28 for rotation therewith.

The upper wall 24 of the lower section 22 of the housing is formed with a well 32 beneath the motor 26. The well 32 has a bottom wall 33 with a sleeve opening 34 through it. A shaft 35 is received within the sleeve opening 34. One side 36 of the lower end of the shaft 35 is flattened for purposes to appear. Above the flattened portion of the shaft is a portion 37 of a relatively larger diameter that is received within the sleeve opening 34. Then, above the larger portion 37, there is a longer portion 38 of somewhat smaller diameter that extends upwardly into an opening 39 within a plate 40 of the motor 26. The opening 39 positions the upper end of the shaft.

There is a recess 44 within the bottom 33 of the well 32 and spaced laterally from the sleeve opening 34. This recess 44 receives the lower end of another shaft 45 with the upper end of the shaft 45 being positioned within a hole 46 in the plate 40 which is supported by the motor 26.

There shafts 38 and 45 support a plurality of nylon gears to provide a reduction gear train for the motor 26. Thus, mounted to rotate about the shaft 38 is a large spur gear 47 which is driven by the motor pinion 29. A small pinion gear 48, integral with the spur gear 47, rotates with the spur gear. The pinion 48 drives a spur gear 49 that is rotatably mounted upon the shaft 45, and the spur gear 49 has a pinion gear 50 formed integrally with it that rotates with the spur gear 49 to drive a spur gear 51. The spur gear 51 and a pinion 52 formed integrally with it are mounted to rotate upon the shaft 38. The pinion 52 drives another spur gear 53 which, with its pinion gear 54, is rotatably mounted upon the shaft 45. Each of these aforementioned gears is conventionally mounted to freely rotate upon its shaft without axial movement along the shaft.

Finally, the pinion gear 54 drives a spur gear 55 that is a part of a slip clutch. The spur gear 55 has a central plate portion 56 extending from its lower side. As shown in FIGURE 14, the plate portion 56 has a recess 57 in its center that houses a ratchet wheel 58. The lower portion of the shaft 35 that has the flat side 36 is keyed to this ratchet wheel 58 and the teeth of the ratchet wheel 58 are normally engaged by a plurality of metal leaf springs 59. Hence, when the spur gear 55 rotates, the leaf springs 59 rotate with it and cause the ratchet wheel 58 to rotate. Because the ratchet wheel 58 is keyed to the shaft 35, the shaft also rotates. However, the shaft 35 can be manually rotated while the motor 26 is not running if a sufficient force is applied to overcome the inwardly biasing force of the leaf springs 59, as will be explained.

The lower housing section 22 has a bottom wall 62, and a valve shaft 63 extends through this bottom wall. The valve shaft 63 has a recess 64 through its top that receives the lower end 36 of the shaft 35. Also, there is a hand wheel 65 fixed to the upper end of the valve shaft 63. The hand wheel 65 has a hole 66 through its top with a flattened side for engaging with the flat side 36 of the shaft 35 to lock the hand wheel 65 against rotation about the shaft 35. Since the valve shaft 63 is fixed to the hand wheel 65, rotation of the shaft 35 and the hand wheel 65 causes the valve shaft 63 to rotate.

A pin 67 extends from the bottom side of the shaft 63. The pin 67 has a pair of opposite flattened sides 68 (as shown in FIGURE 8). A hollow, thin-walled valve member 69 having a top wall 70 with a rectangular slot 71 through the top wall, is mounted upon the pin 67. The pin 67 projects through the rectangular shaped slot 71 and the valve member 69 is retained by a washer 72 with the head 73 of the pin 67 being peened over to lock the washer and the valve member in place. The rectangular slot 71 cannot rotate about the pin 67 because of the flattened sides 68 of the pin. However, the ends 74 of the rectangular slot 71 are spaced far enough apart to allow some sliding movement of the valve member 69 relative to the pin 67. Thus, the valve member 69 can shift laterally on the pin 67 about 0.015 inch.

The valve member 69 is of very thin wall steel that will deform somewhat under pressure. Opposite sides of the valve member 69 have fluid passages 75 and 76 through them. These fluid passages 75 and 76 are disposed transversely to the direction of lateral shifting of the valve member 69.

The valve member 69 fits within a valve pipe fitting 80. This valve pipe fitting 80 is a casting having an inlet port 81 and an outlet port 82. A water pipe 83 is soldered to the inlet port 81 and a water pipe 84 is soldered to the outlet port 82.

At its center, the valve pipe fitting 80 has an upwardly extending portion 85 that has a cylindrical valve chamber recess 86 through it. This valve chamber recess 86 has a closed lower end 87 with the side wall sleeve openings 88 and 89 that communicate with the water pipes 83 and 84, respectively. The valve member 69 fits within this cylindrical valve chamber recess 86 so that the valve member openings 75 and 76 can communicate with the pipe fitting openings 88 and 89. There is a clearance of between 0.008 and 0.010 inch between the side wall of the valve member 69 and the side wall of the valve chamber 86. This clearance is less than the amount the valve member 69 can shift on the pin 67.

In order to provide a fluid seal, the valve shaft 63 is provided with a bushing 90. There is an O ring seal 91 between the valve shaft 63 and the bushing 90 and another O ring seal 92 between the bushing 90 and the side wall 86 of the valve chamber.

There is a bayonet joint connection between the valve housing 20 and the valve pipe fitting 80 including a pair of tabs 95 that extend downwardly and inwardly from the bottom wall 62 of the lower housing section 22. These tabs are shown particularly in FIGURES 5 and 12. A pair of flange extensions 96 that extend outwardly from the top of the valve chamber extension 85 of the valve pipe fitting 80 can fit between these tabs 95 and the lower housing walls. Thus, by fitting the housing with its tabs 95 adjacent the flange extensions 96 and rotating the housing, the motor housing is locked to the valve pipe fitting. Conversely, by merely pivoting the housing, the entire valve assembly including the housing 20, its gear train and the valve member 69 can be quickly removed. Then, either another valve may be substituted or, if no valve is to be used, a plate may be fixed across the upper opening of the valve chamber recess 86 in the valve pipe casting 80.

The shaft 35 controls an automatic timing device. It includes a Bakelite disc 100 keyed to the lower flattened end of the shaft 35. This disc 100 rotates within a central hole 101 of a surrounding Bakelite disc 102. The disc 102 is fastened by a plurality of screws 103 to a plurality of posts 104 that are suspended from the lower wall 33 of the housing well 32. A Bakelite ring 105 positioned below the disc 100 and an electrically conductive ring 106 positioned above the disc 100 are fastened to the disc 100 by pins 107. These discs 105 and 106 extend inwardly beyond the outer edge of the disc 100 and outwardly beyond the inner edge of the disc 102 to prevent the disc 100 from sliding axially along the shaft 35.

The stationary Bakelite plate 102 supports four contact strips 110, 111, 112 and 113 that are fastened to the plate 102 by pins 114. The contact plate 106 is extended radially outwardly to define a pair of opposed contact rotors 115 and 116. Each of these contact rotor extensions defines an arc of 90° with a pair of lands 117 between them of 90° arcs.

Each of the contact strips 110, 111, 112 and 113 has a contact finger 118 that extends inwardly far enough to engage the contact rotors 115 and 116 as the contact plate 106 rotates. In addition to the contact strips 110, 111, 112 and 113, there is a contact strip 119, fastened by a pin 120 to the stationary plate 102, that extends further inwardly and has a contact finger 121 to make continual contact with the contact plate 106.

The wiring diagram for the control of FIGURE 7 is shown schematically in FIGURE 13. One side of a power supply 123 is connected by a wire 124 to the motor 26. The other side of the power supply is connected by a wire 125 to a temperature responsive bimetallic switch contact arm 126. The switch contact arm 126 is movable between contact terminals 127 and 128 with magnets 129 or the like being provided to prevent "hunting" by the bimetallic switch.

The terminal 127 is connected by a wire 130 to a pair of branch wires 131 and 132 that, in turn, are connected to the contact strips 111 and 113, respectively. The other contact terminal 128 is connected by a wire 133 to a pair of branch wires 134 and 135, and these branches 134 and 135 are connected to the terminal strips 110 and 112, respectively. The other terminal strip 119 that is in continuous contact with the contact plate 106 is connected by a wire 136 to the motor 26.

The control circuit of FIGURE 13 causes the shaft 35 to rotate a quarter of a turn each time the bimetallic switch 126 engages a different contact point 127 or 128 in response to temperature changes. Assuming that the motor 26 operates to rotate the shaft 35 in a counterclockwise direction, as viewed in FIGURE 13, it is apparent that, in FIGURE 13, a circuit is energized from the power supply 123 through the bimetallic switch 126, the wire 130 and the wires 131 and 132 to the contact strips 111 and 113. The circuit continues through the contact plate 106 to the contact strip 119 and then to the motor by way of the wire 135 and back to the power supply by way of the wire supply 124. Hence, the shaft 35 is rotating and will continue to rotate until the trailing edges of the rotor contacts 115 and 116 break contact with the contact strips 111 and 113. Then the motor will stop. When that happens, however, the leading edges of the rotor contacts 115 and 116 will have made contact with the contact strips 112 and 110, respectively. Consequently, when the bimetallic switch arm 126 shifts into contact with the terminal 128, a different circuit is closed that includes the wire 133 and the wire branches 134 and 135 that are connected to the terminal strips 110 and 112, respectively. This different circuit is then completed through the contact plate 106, the contact strip 119, the wire 135, through the motor 126 and back to the power supply by way of the wire 124. The motor will then operate until the shaft 35 has made another quarter turn and the trailing edges of the rotor contacts 115 and 116 break contact with the terminal strips 112 and 110, respectively. The foregoing operation takes place each time the bimetallic switch 126 shifts.

There is a metal cover 140 fastened to the side of the housing 20 by a pair of screws 141. This cover 140 supports a plurality of wire connector assemblies 142. All of these wire connector assemblies 142 are similar and a typical one is shown in cross-section in FIGURES 9 and 10. As shown in FIGURE 9, the wire 130 is soldered to a conductive angle member 143 that, together with an electrically conductive spring metal strip 144, is fastened by a rivet 145 to the side wall 146 of the cover 140. The spring steel strip 144 extends downwardly with its lower ends 147 being terminated just short of a shelf 148 that extends inwardly from the side wall 146 of the cover. There is a hole 149 through the side wall 146 at the level of the shelf 148 through which the bared end 150 of a wire 151 can project. As shown in FIGURE 9, when the bared end 150 of the wire is extended through the hole 149, it displaces the end 147 of the spring-strip 144 to a certain extent to allow the wire end 150 to pass between the shelf 148 and the end 147 of the strip 144. However, the spring strip 144 is biased toward a vertical position and presses against the top of the wire end 150. Therefore, when an attempt is made to withdraw the wire 151, the frictional engagement against the wire end 150 by the end 147 of the spring strip 144 prevents the ready removal of the wire 151.

There is another hole 152 through the side wall 146 of the cover, spaced slightly above the wire hole 149. A plastic release dowel 153 extends through the hole. The dowel 153 has a head 154 on its inner end for preventing removal of the dowel, the head being blocked by the spring strip 144 in an inward direction.

When the wire is to be removed, the dowel 153 is pressed inwardly as illustrated in FIGURE 10. The head 154 of the dowel presses the spring strip 144 inwardly and away from the bared end 150 of the wire 151. Then, while the dowel 153 is held in a depressed position, the wire 151 can be easily removed.

*Operation*

In preparing for the use and operation of this valve assembly, it is assumed that a pair of pipes 83 and 84 have been provided with the proper pipe fitting 80 having a valve chamber recess 86 in it. If the valve chamber 86 is covered by a suitable cover plate, that cover plate is removed and the valve member 69 of the valve assembly is directed into the valve chamber 86, while the bottom wall 62 of the valve housing 20 is moved to a resting position on top of the pipe fitting 80. The relative positions of the tabs 95 and the pipe fitting flanges 96 prior to locking the valve assembly to the pipe fitting are illustrated in FIGURE 12. Then, to lock the valve housing to the pipe fitting, the valve housing is rotated in the direction of the arrows of FIGURE 12 until the tabs 95 interlock with the flanges 96. Thereafter, the bared ends of the appropriate wires (such as the wire 151 of FIGURES 9 and 10) are passed through the proper holes in the side wall 146 of the cover 140 to make electrical contact with the several control wires 124, 130 and 133. Then the valve is ready for operation.

In the operation of the valve, it is assumed that the bimetallic switch 126 is positioned to sense the temperature of the hot water so that this bimetallic switch can control the opening and closing of the valve. As illustrated in FIGURE 5, the valve member 69 is in the open position so that fluid can flow from the pipe 83 through the valve port 81 into the chamber 86, through the opening 75 and through the opening 76 in the valve member 69 and out the outlet port 82 to the pipe 84. When the bimetallic switch 126 senses too great a temperature in the water, it shifts to a valve closing position. Then the electric circuit 13 operates as has already been described to rotate the valve shaft 35 and with it the valve 63, one-quarter of a turn. This rotates the valve member 69 so that its openings 75 and 76 are transverse to the line of fluid flow defined by the pipes 83 and 84 and the inlet and outlet ports 88 and 89. Instead, the solid wall of the valve member is opposite the outlet port 89, as illustrated in FIGURE 8. In this position of the valve, the pressure of the fluid through the inlet port 88 presses against the side wall of the valve member 69 nearest the inlet port 88 and causes the valve member 69 to slide toward the outlet port 89, this sliding movement being permitted by the rectangular slot 71 and the flattened construction of the pin 73. The extent of this sliding movement that is possible is greater than the clearance between the valve member 69 and the valve chamber 86 so that the solid side wall of the valve member 69 nearest the outlet port 89 engages the walls of the valve chamber surrounding the outlet port 89. This wall-engaging side wall of the valve member is pressed against the wall of the valve chamber by the fluid pressure from the inlet port 88. Because the valve member is constructed of thin-wall steel, the fluid pressure bends the valve member somewhat to provide a better seat between the valve member and the chamber wall, as well as to provide a greater area of contact between the valve member and the chamber wall.

When the water senses by the thermostatic switch 126 becomes too cold, that switch again shifts and closes another circuit through the motor 26, as has been explained, this causing the valve member 69 to be rotated again a quarter of a turn by the valve shaft 63 which, in turn, is caused to rotate by the shaft 35. This quarter turn of the valve member 69, again aligns the openings 75 and 76 with the inlet and outlet ports 88 and 89. While it is true, that the position of the openings 75 and 76 will be reversed from their previous positions when the valve was open, the cylindrical symmetry of the valve member 69 and of the valve chamber 86 allows proper operation of the valve in either position of these openings 75 and 76.

If the valve is connected and it is found that the openings 75 and 76 do not properly align with the inlet and outlet ports 88 and 89, after the control circuit of FIGURE 13 has operated to the position at which these openings and ports should be aligned, they can be manually aligned. The wheel 65 projects through openings in the side walls in the housing and this wheel can be manually rotated against the force of the leaf springs 59 of the slip clutch of FIGURE 14. This manual rotation of the hand wheel 65 when the motor 26 is not operating, causes the valve shaft 63 and the shaft 35 to rotate relative to the motor shaft 28 because the valve shaft 63 and the shaft 35 are connected directly to the hand wheel 65 whereas the motor shaft 28 is connected through a series of gears to the spare gear 55. When the hand wheel is rotated to rotate the shaft 35, the ratchet wheel 58 allows the shaft 35 to rotate while the gear 55 is held stationary by its engagement with the pinion gear 58.

Thus, the hand wheel 65 through the mechanism of the slip clutch of FIGURE 14 allows alignment of the valve member with the inlet and outlet ports 88 and 89. Also, the valve can be manually operated by the hand wheel.

When the valve assembly is to be removed from the pipe fitting 80, the wires 151 are easily disconnected by depressing the release dowels 153 and then removing the wires 151. Then the housing is rotated relative to the pipe fitting 80 so that the engagement between the tabs 95 and the flanges 96 is broken. Thereafter the valve assembly can be lifted free of the pipe fitting.

Various changes and modifications may be made within the process of this invention as will be readily apparent to those skilled in the art. Such changes and modifications are within the scope and teaching of this invention as defined by the claims appended hereto.

What is claimed is:

1. In a valve having a housing including a valve chamber, an inlet port and an outlet port in the valve chamber, a valve member for opening and closing the valve chamber, and a thermostatically controlled non-reversible motor for intermittently rotating the valve member through ninety degree turns, the improvement wherein the valve chamber has a cylindrical side wall, a rotatable valve shaft projecting into the valve chamber, the outlet port having a smaller diameter than that of the cylindrical side wall, the valve member having a thin cylindrical wall within and generally coaxial with the cylindrical wall of the valve chamber, a pair of diametrically opposed openings through the cylindrical wall of the valve member, the valve member having solid walls between the openings, the external diameter of the valve member being less than the internal diameter of the valve chamber, the valve member having a top by which it is slidably suspended from the valve shaft, whereby rotation of the valve shaft rotates the valve member to alternately establish communication between the inlet and outlet ports through the openings in the valve member and to block such communication by positioning a solid wall opposite the outlet port and a solid wall opposite the inlet port, the slidable support of the valve member permitting the valve member to slide toward the outlet port in response to inlet pressure against a solid wall, the valve member being sufficiently thin to be deformable by the inlet pressure to increase the seating area around the outlet port, the inlet pressure thereby seating a solid wall against the outlet port, the valve member being symmetrical in having diametrically opposed solid walls and diametrically opposed holes so that consecutive opening and closing of the valve can be accomplished by rotating the valve member in a single direction.

2. The valve of claim 1 wherein the valve member is generally coaxial with the valve shaft, the top of the valve member having an opening through it two sides of which are defined by straight edges parallel to the solid walls, the shaft having a portion extending through the slot, the portion of the shaft having straight sides slidably contacting the straight sides of the slot, whereby when the valve shaft is rotated the straight sides provide a rotating drive generally at the axial center of the valve member while permitting the valve member to slide parallel to the straight sides only.

References Cited in the file of this patent

UNITED STATES PATENTS

| | | |
|---|---|---|
| Re. 20,471 | Kelty | Aug. 17, 1937 |
| 1,160,342 | Taft | Nov. 16, 1915 |
| 1,320,594 | Windibank | Nov. 4, 1919 |
| 1,350,077 | Loudon | Aug. 17, 1920 |
| 1,419,571 | Kinser | June 13, 1922 |
| 1,532,251 | Lorraine | Apr. 7, 1925 |
| 1,596,049 | Kienast | Aug. 17, 1926 |
| 1,756,823 | Harris | Apr. 29, 1930 |
| 1,969,733 | Drake | Aug. 14, 1934 |
| 2,160,400 | Cunningham | May 30, 1939 |
| 2,374,195 | Guarnaschelli | Apr. 24, 1945 |
| 2,511,477 | Mueller | June 13, 1950 |
| 2,696,968 | Fillips | Dec. 14, 1954 |
| 2,872,154 | Jones | Feb. 3, 1959 |
| 2,930,576 | Sanctuary | Mar. 29, 1960 |
| 3,011,754 | Ander | Dec. 5, 1961 |

FOREIGN PATENTS

| | | |
|---|---|---|
| 180,903 | Great Britain | June 8, 1922 |